(12) United States Patent
Schrand

(10) Patent No.: US 12,447,813 B2
(45) Date of Patent: Oct. 21, 2025

(54) DISTRIBUTED ELECTRICALLY VARIABLE TRANSMISSION

(71) Applicant: FCA US LLC, Auburn Hills, MI (US)

(72) Inventor: Edward V Schrand, Farmington, MI (US)

(73) Assignee: FCA US LLC, Auburn Hills, MI (US)

( * ) Notice: Subject to any disclaimer, the term of this patent is extended or adjusted under 35 U.S.C. 154(b) by 162 days.

(21) Appl. No.: 18/192,408

(22) Filed: Mar. 29, 2023

(65) Prior Publication Data
US 2024/0326576 A1 Oct. 3, 2024

(51) Int. Cl.
*B60K 6/445* (2007.10)

(52) U.S. Cl.
CPC .................... *B60K 6/445* (2013.01)

(58) Field of Classification Search
CPC .. B60K 6/445; B60K 2006/381; B60K 6/387; B60K 6/52
See application file for complete search history.

(56) References Cited

U.S. PATENT DOCUMENTS

| 2008/0302590 | A1* | 12/2008 | Sato | ............... B60W 30/18109 180/242 |
| 2017/0136867 | A1* | 5/2017 | Holmes | ................... B60K 6/48 |
| 2017/0136870 | A1* | 5/2017 | Littlefield | ............. B60K 6/365 |

FOREIGN PATENT DOCUMENTS

| CN | 109849644 A | * | 6/2019 | ............... B60K 6/52 |
| CN | 114083977 A | * | 2/2022 | ............... B60K 6/26 |

* cited by examiner

*Primary Examiner* — Tisha D Lewis
(74) *Attorney, Agent, or Firm* — Jeremy J. Klobucar

(57) ABSTRACT

A hybrid electric vehicle (HEV) includes a front driveline configured to drive front wheels, a rear driveline configured to drive rear wheels, and an electrically variable transmission (EVT) including a power splitting gear set. An internal combustion engine is selectively connected to an input member of the EVT to provide drive torque to the front driveline. A first electric machine is coupled to the EVT via a connecting member to selectively provide drive torque to the front driveline. A second electric machine is configured to selectively provide drive torque to the rear driveline. A battery is electrically coupled to the first and second electric machines for powering thereof. The internal combustion engine, the EVT, and the first and second electric machines are configured to provide the HEV with four-wheel drive or all-wheel drive capability.

9 Claims, 5 Drawing Sheets

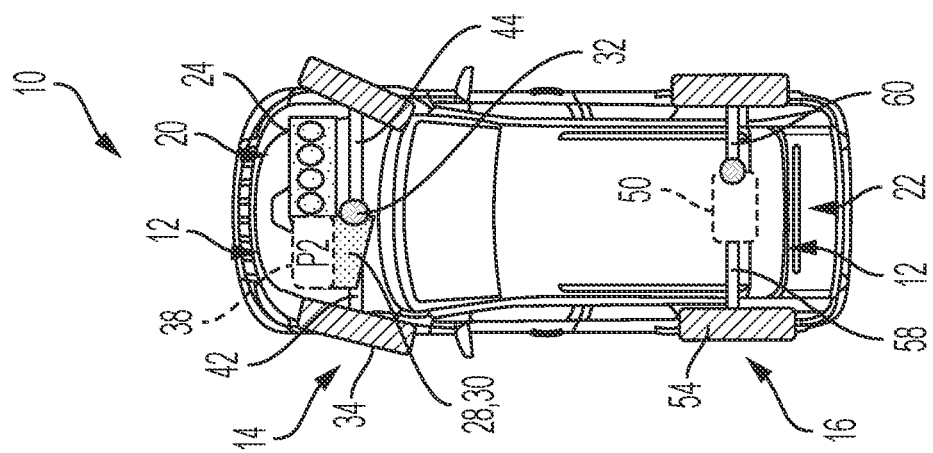
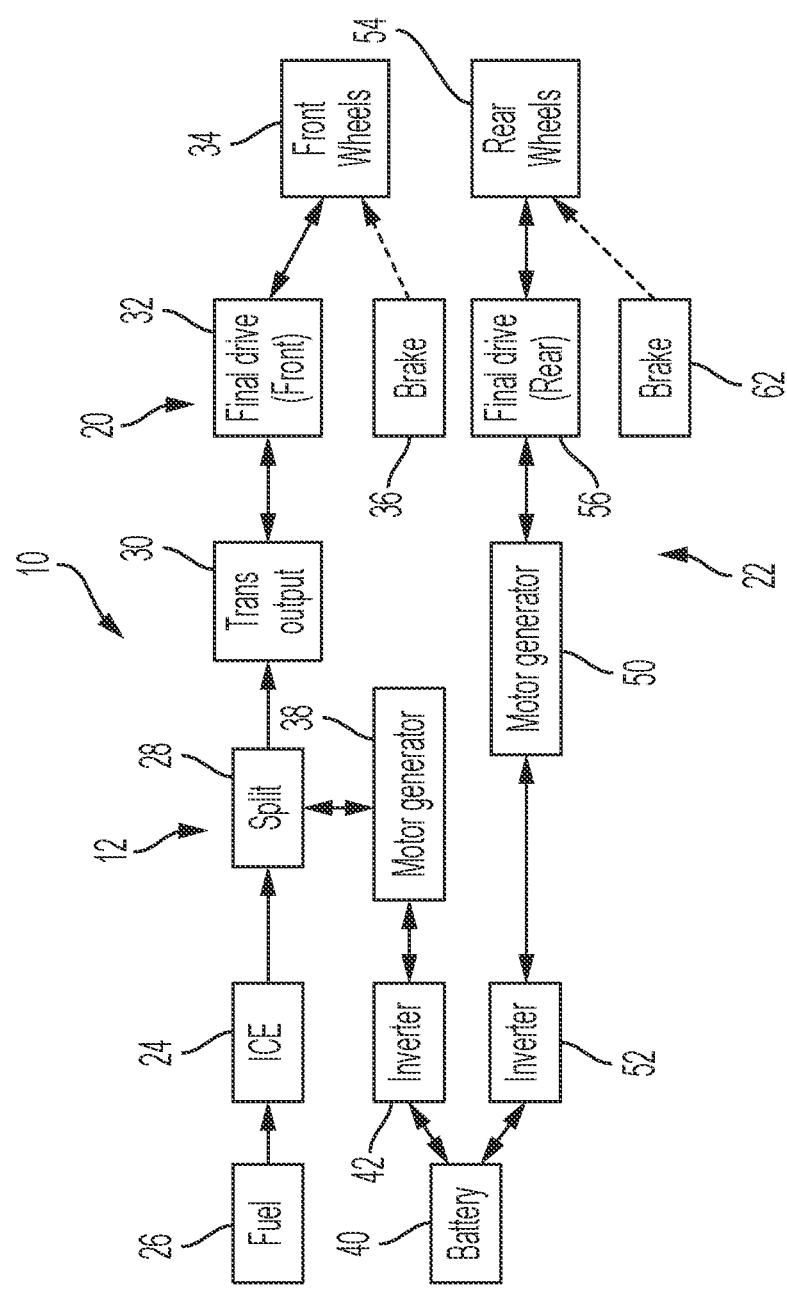
FIG. 2
FIG. 1

DISTRIBUTED ELECTRICALLY VARIABLE TRANSMISSION

FIELD

The present application relates generally to a transmission for a vehicle and, more particularly, to a hybrid vehicle with a distributed electrically variable transmission.

BACKGROUND

A power split transmission is one type of transmission used for hybrid electric vehicles (HEV). Power split transmissions can utilize two electric motors ("e-motors") and can utilize epicyclic differential gearing (i.e., planetary gear sets) in a way that transmits part of the power of an internal combustion engine through a mechanical path to the output, and transmits another part on an electrical path. The electrical path typically includes the two e-motors, where one of them operates as a motor and the other as a motor or generator. By varying the speeds of the e-motors, variable transmission ratios for transmitting engine power to ground can be obtained. Such a transmission arrangement can be referred to as an electrically variable transmission (EVT). However, traditional EVT-equipped vehicles are limited to front wheel drive (FWD) or require additional costly components or mechanical systems to achieve all-wheel drive (AWD). Accordingly, while such systems do work for their intended purpose, there is a desire for improvement in the relevant art.

SUMMARY

In accordance with one example aspect of the invention, a hybrid electric vehicle (HEV) is provided. In one exemplary implementation, the HEV includes a front driveline configured to drive front wheels, a rear driveline configured to drive rear wheels, and an electrically variable transmission (EVT) including a power splitting gear set. An internal combustion engine is selectively connected to an input member of the EVT to provide drive torque to the front driveline. A first electric machine is coupled to the EVT via a connecting member to selectively provide drive torque to the front driveline. A second electric machine is configured to selectively provide drive torque to the rear driveline. A battery is electrically coupled to the first and second electric machines for powering thereof. The internal combustion engine, the EVT, and the first and second electric machines are configured to provide the HEV with four-wheel drive or all-wheel drive capability.

In addition to the foregoing, the described HEV may include one or more of the following features: wherein the first electric machine is arranged as a P2 motor, and wherein the second electric machine is arranged as a P4 motor; wherein the second electric machine is distributed across a rear axle of the HEV; wherein the power splitting gear set is a power splitting planetary gear set; and wherein the power splitting planetary gear set includes a carrier coupled for rotation with the input member, a sun gear coupled for rotation with the connecting member, an annulus gear, and a plurality of pinion gears coupled to the carrier and in meshing engagement with the sun gear and the annulus gear.

In addition to the foregoing, the described HEV may include one or more of the following features: wherein the annulus gear is connected to a transfer gear arrangement to provide drive torque thereto; wherein the transfer gear arrangement includes an input gear configured to be driven by the annulus gear, and an output gear connected for common rotation with the input gear; wherein the transfer gear arrangement is connected to a final drive to provide drive torque thereto; wherein the final drive includes a differential; and a first power inverter module electrically coupled between the first electric machine and the battery, and a second power inverter module electrically coupled between the second electric machine and the battery.

In addition to the foregoing, the described HEV may include one or more of the following features: a controller configured to operate the HEV in an HEV mode where the internal combustion engine provides drive torque to the front driveline, and the second electric machine provides drive torque to the rear driveline, and operate the HEV in an electric vehicle (EV) mode where the first electric machine provides drive torque to the front driveline, and the second electric machine provides drive torque to the rear driveline; a brake clutch and a selectable one-way clutch (SOWC) operably coupled to the input member to selectively ground the input member; wherein the first electric machine is concentric with the power splitting gear set and the input member; wherein an output of the internal combustion engine is coupled to a torsional vibration damper; an electric drive module that includes the second electric machine and a gearbox assembly coupled to a differential; and wherein the vehicle does not include a P3 motor.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 1 is a schematic illustration of an example hybrid electric vehicle (HEV) drivetrain with an electrically variable transmission (EVT), in accordance with the principles of the present application;

FIG. 2 is a schematic illustration of the HEV of FIG. 1 with the EVT distributed across front and rear axles, in accordance with the principles of the present application;

DETAILED DESCRIPTION

Figure 3:
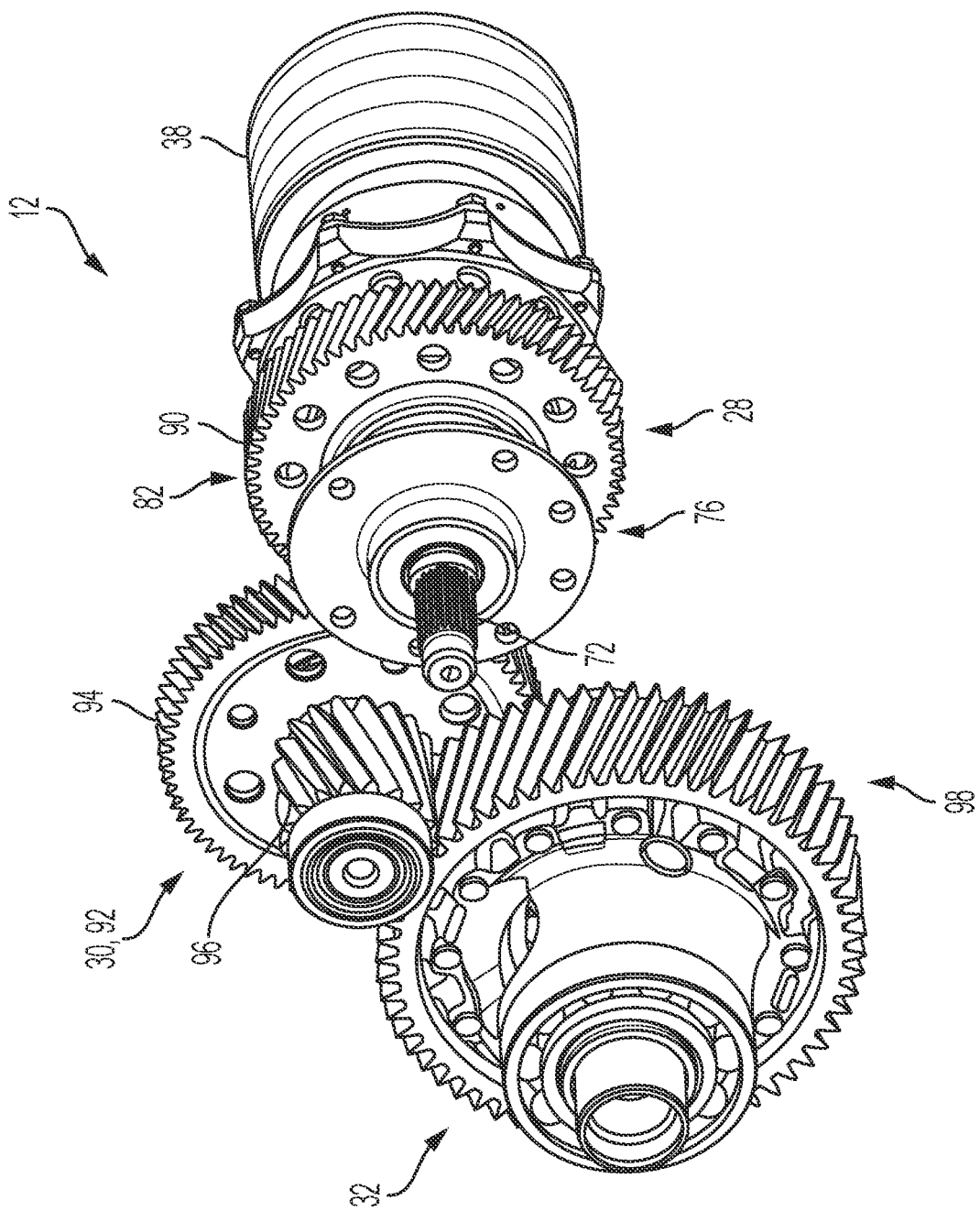
FIG. 3 is a perspective view of a portion of the example distributed EVT shown in FIGS. 1 and 2, in accordance with the principles of the present application.

According to the principles of the present application, systems and methods are described for a hybrid electric vehicle (HEV) with an electrically variable transmission (EVT). As described herein in more detail, the EVT components are distributed across both the front and rear axles to provide an inherent AWD capability. Specifically, the internal combustion engine and P2 electric machine are packaged together as a single FWD propulsion system. A P4 electric machine is disposed on the rear axle to deliver torque to the rear wheels. Accordingly, the described system reduces cost, weight, and packaging space compared to conventional EVT AWD solutions.

With initial reference to FIGS. 1 and 2, an HEV 10 with a distributed electrically variable transmission (EVT) system 12 is illustrated in accordance with the principles of the present disclosure. By distributing the EVT system 12 across a front driveline 14 and a rear driveline 16, the vehicle 10 advantageously provides four-wheel-drive (4 WD) or all-wheel-drive (AWD) capability.

In the example embodiment, vehicle 10 includes a first or front propulsion system 20 and a second or rear propulsion system 22. The front propulsion system 20 generally includes an internal combustion engine 24 receiving fuel from a fuel tank 26, an EVT power split 28, a transmission output 30, and a final drive 32 for driving front wheels 34 associated with regenerative braking system 36. Additionally, the front propulsion system 20 includes an electric machine (e.g., electric traction motor 38), which can operate reversibly as a motor or a generator. In the example arrangement, electric motor 38 is commonly designated as a "P2" motor.

As illustrated, the electric motor 38 is electrically coupled to one or more batteries 40 via a power inverter module (PIM) 42. In the illustrated arrangement, the electric machine 38 is operably coupled in the front propulsion system 20 to either receive torque from the EVT power split 28 to charge the battery 40 (e.g., regenerative braking), or provide torque to the EVT power split 28 to alternatively drive front wheels 34, as will be described in more detail. In this way, the engine 24 and/or the electric machine 38 are configured to provide drive torque to the final drive 32 (e.g., a differential), which transfers the drive torque through axle shafts 42, 44 (FIG. 2) to the front wheels 34.

In the example implementation, the rear propulsion system 22 includes an electric machine (e.g., electric traction motor 50), which can also operate reversibly as a motor or a generator. The electric motor 50 is electrically coupled to the battery 40 via a PIM 52, and is part of an electric drive module configured to drive rear vehicle wheels 54 through a final drive 56 (e.g., differential 56) and rear axle shafts 58, 60. The rear wheels 54 are associated with a rear regenerative braking system 62 to enable the electric motor 50 to generate electricity, which may then be stored in the battery 40 for later use by electric motors 38, 50. While in a traditional EVT layout the electric motor would be packaged as a P3 motor in the front propulsion system, the present disclosure advantageously distributes the electric motor 50 across the rear axle in a P4 configuration (without a P1 or P3 motor) to allow vehicle 10 to operate in a 4WD or AWD mode. In one example, as used herein, the term "Pn" refers to a particular position "P" of the electric traction motor within the vehicle drivetrain. For example, P1 refers to a motor positioned at the engine output, P2 refers to a motor positioned between the engine and transmission, P3 refers to a motor positioned at the transmission output, and P4 refers to a motor positioned on the rear axle.

With additional reference now to FIGS. 3 and 4, the EVT system 12 will be described in more detail. In the example embodiment, the EVT system 12 is coupled to a prime mover, such as engine 24, a torsional vibration damper 70, and a final drive 32. The engine 24 provides drive torque to an input member 72 to the EVT system 12, and transmission output 30 of the EVT system 12 is coupled to the final drive 32 to deliver driving power to the front wheels 34.

In the example embodiment, EVT system 12 generally includes a selectively engageable torque transmitting device 76, EVT power split 28, electric motor 38, and transmission output 30. By way of example, the selectively engageable torque transmitting device 76 may be an input brake or clutch brake, a friction clutch, a wet clutch, a one-way clutch, or combinations thereof. In the illustrated example, the device is a brake clutch B1 with a selectable one-way clutch (SOWC) 76.

In the example configuration, EVT power split 28 is a single power splitting planetary gear set 78. However, it will be appreciated that various gear reduction configurations can be employed in EVT system 12. As illustrated in FIG. 4, planetary gear set 78 includes a sun gear 80, an annulus gear 82, and a carrier 84 configured to rotatably support a plurality of planet or pinion gears 86 in meshing engagement with both the sun gear 80 and the annulus gear 82.

Figure 4:
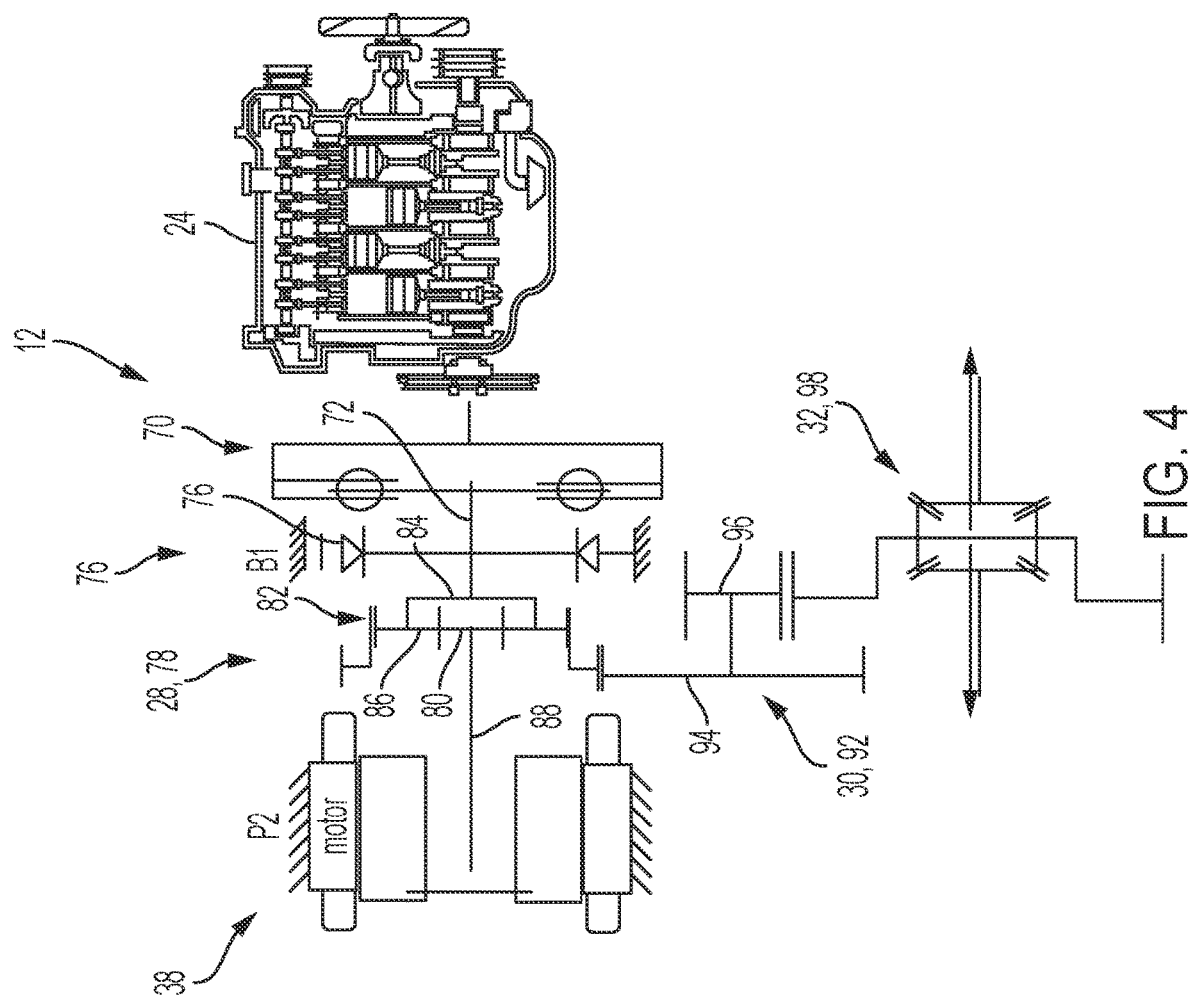
FIG. 4 is a schematic illustration of an example forward propulsion system of the HEV shown in FIGS. 1-3, in accordance with the principles of the present application.

In the example configuration shown in FIG. 4, the output of engine 24 is coupled to the torsional vibration damper 70, which can include a torque limiting device. As discussed above, the brake B1 and SOWC 76 can be configured to selectively engage input member 72 and is one example of various torque transmitting devices and/or input brakes utilized to selectively ground or fix rotation of input member 72, which will in turn ground engine 24. The input member 72 is coupled to the carrier 84, and the pinion gears 86 are in continuous meshing engagement between the sun gear 80 and the annulus gear 82.

The sun gear 80 is continuously non-rotatably coupled to the electric motor 38 via a shaft or connecting member 88 for common rotation therewith. An inner diameter of the annulus gear 82 is in continuous meshing engagement with the pinion gears 86, while an outer diameter 90 (FIG. 3) of the annulus gear 82 is in continuous meshing engagement with the transmission output 30. In the illustrated example, transmission output 30 is a transfer gear arrangement 92 having an input gear 94 connected for common rotation with an output gear 96 that is in continuous meshing engagement with a final drive gear set 98 (FIG. 3). However, it will be appreciated that transfer gear arrangement 92 may have additional gears or configurations depending on, for example, packaging considerations of the associated vehicle.

In the example embodiment, the electric motor 38 is concentric with the planetary gear set 78 and input member 72 to provide a compact EVT arrangement. In operation of the front propulsion system 20, drive torque output from engine 24 and/or electric motor 38 is directed via the planetary gear set 78 to transfer gear arrangement 92, which then directs the output to the final drive/differential 32, axle shafts 42, 44, and front wheels 34.

Figure 5:
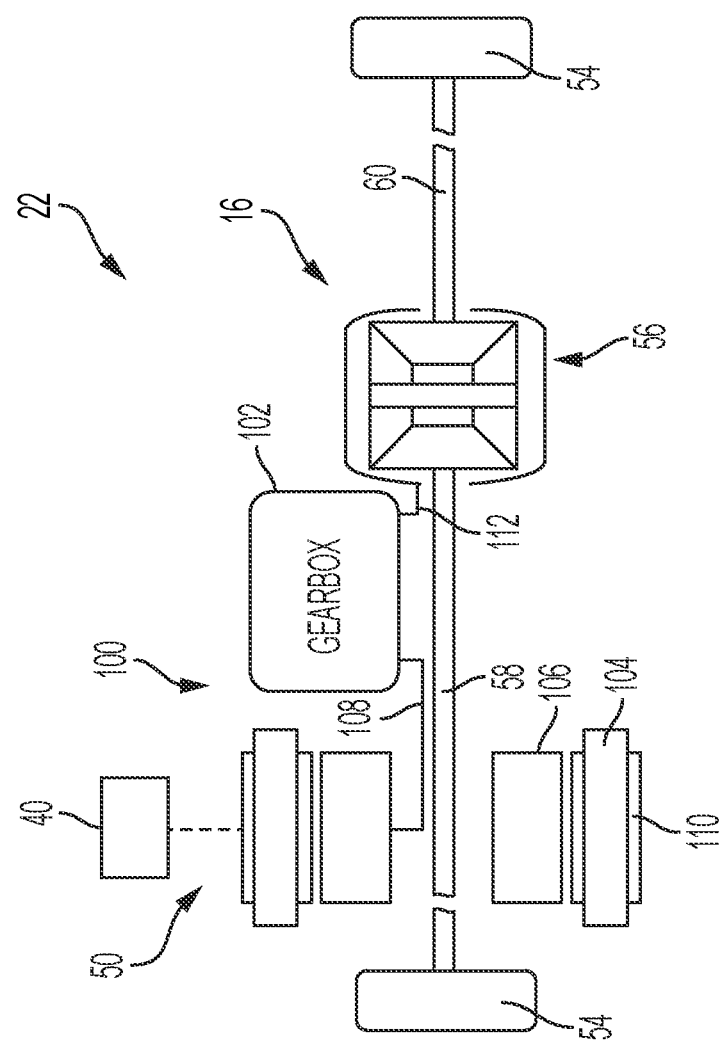
FIG. 5 is a schematic illustration of an example rear propulsion system of the HEV shown in FIGS. 1 and 2, in accordance with the principles of the present application.

With additional reference to FIG. 5, the rear propulsion system 22 will be described in more detail. In the example embodiment, the rear propulsion system 22 includes an electric drive module 100 (which is part of the distributed EVT system 12) having electric motor 50 and a single or multi-speed gearbox assembly 102. The electric motor 50 is electrically connected to the high voltage battery 40 for charging thereof, or powering the electric motor 50. The gearbox assembly 102 is configured to transfer the drive torque generated by motor 50 to the rear driveline 16, including differential 56 and rear axle shafts 58, 60. The rear driveline 16 may also include a disconnect mechanism (not shown), such as a clutch, to decouple the electric motor 50 from the axles 58, 60 at high vehicle speeds.

In the example embodiment, the electric motor 50 generally includes a stator 104, a rotor 106, and a rotor output shaft 108. The stator 104 is fixed (e.g., to a housing 110) and the rotor 106 is configured to rotate relative to the stator 104 to drive the rotor shaft 108, which is linked to the gearbox assembly 102. Rotational output from the motor output shaft 108 is received by the gearbox assembly 102, which then transfers the rotational output through a gear set (e.g., planetary gear set(s), not shown) to a gearbox output shaft 112. Rotation from output shaft 112 is then directed to the rear driveline 16 and thus the vehicle axles 58, 60 and rear wheels 54.

Figure 6:
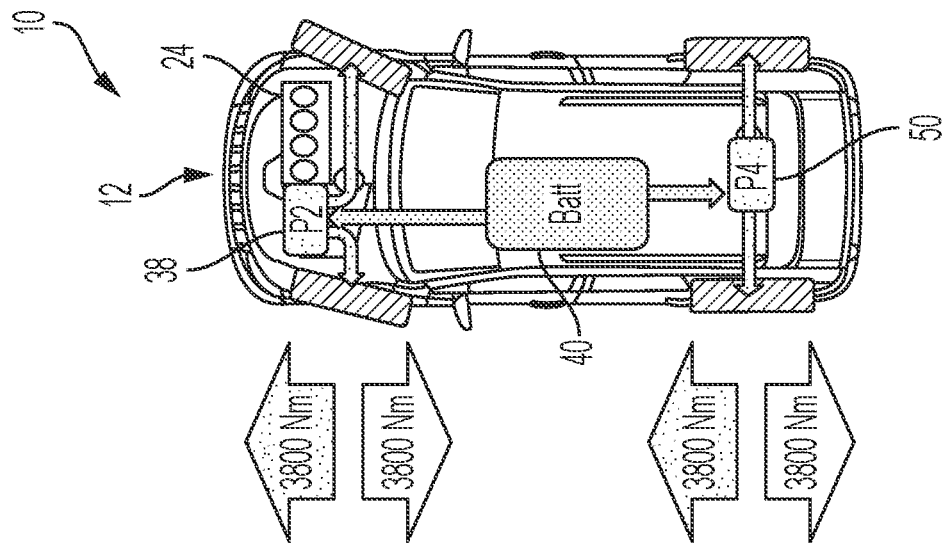
FIG. 6 is a schematic illustration of the HEV shown in FIG. 2 operating in an example HEV mode, in accordance with the principles of the present application.
Figure 7:
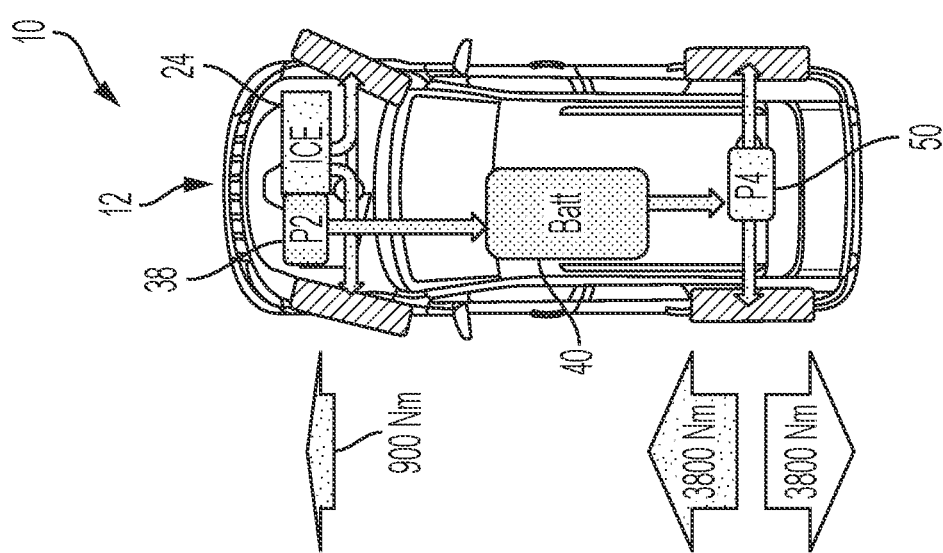
FIG. 7 is a schematic illustration of the HEV shown in FIG. 2 operating in an example electric vehicle (EV) mode, in accordance with the principles of the present application.

With reference now to FIGS. 6 and 7, operational modes of the HEV 10 with distributed EVT system 12 will be described in more detail. FIG. 6 illustrates operation in an HEV mode, and FIG. 7 illustrates operation in an EV mode. One or more controllers (not shown) are in communication with various components of the HEV 10 and EVT system 12, such as the battery 40, engine 24, and electric motors 38, 50, to control operation in the various modes.

With reference now to FIG. 6 and additional reference to FIG. 4, operation in the HEV mode will be described in more detail. In the HEV mode, electric motor 38 is operated to spin up and start the engine 24. With the engine 24 operating and providing drive torque to the EVT power split 28, the electric motor 38 provides a balancing torque to resist the engine torque so the electric motor does not spin backwards. Often, the electric motor torque is set equal to the engine torque, but the speed of the electric motor 38 can be set at any desired speed. By resisting the engine torque, the electric motor 38 generates electricity, which can be stored in battery 40 or utilized to directly drive electric motor 50. The drive torque produced by engine 24 is directed through the EVT power split 28, the transfer gear arrangement 92, and final drive 32 to thereby drive the front wheels 34. In the example shown in FIG. 6, this configuration allows the engine 24 to provide 900 Nm or approximately 900 Nm of torque to the front driveline 14 in the forward direction.

At the same time, the electric drive module 100 with electric motor 50 can be operated to drive the rear wheels 54, to thereby provide 4 WD/AWD to the HEV 10. As previously noted, electric motor 50 is powered by battery 40 and/or electric motor 38. In the example shown in FIG. 6, this configuration allows the electric drive module 100 to provide 3,800 Nm or approximately 3,800 Nm of torque to the rear driveline 16 in the forward or reverse direction.

With reference now to FIG. 7 and additional reference to FIG. 4, operation in the EV mode will be described in more detail. In the EV mode, electric motor 38 and/or electric motor 50 are operated to drive the vehicle 10 in the forward or reverse directions. When both electric motors 38, 50 are operated together, HEV 10 is provided with 4 WD/AWD capability. In this mode, the engine 24 is shut off and brake B1 (FIG. 4) is activated to ground input member 72. Electric motor 38 is powered by battery 40 and provides drive torque to the EVT power split 28, which outputs the drive torque through the transfer gear arrangement 92 and final drive 32 to thereby drive the front wheels 34. In the example shown in FIG. 7, this configuration allows the electric motor 38 to provide 3,800 Nm or approximately 3,800 Nm of torque to the front driveline 14 in the forward or reverse direction.

At the same time, the electric drive module 100 with electric motor 50 is powered by battery 40 and can be operated to drive the rear wheels 54, to thereby provide 4 WD/AWD to the HEV 10. In the example shown in FIG. 7, this configuration allows the electric drive module 100 to provide 3,800 Nm or approximately 3,800 Nm of torque to the rear driveline 16 in the forward or reverse direction.

Described herein are systems and methods for a hybrid electric vehicle with an electrically variable transmission. The EVT components are distributed across both the front and rear axle to provide an inherent AWD capability. Specifically, the internal combustion engine and P2 electric machine are packaged together as a single FWD propulsion system. A P4 electric machine is disposed on the rear axle to deliver torque to the rear wheels in a RWD propulsion system. Accordingly, the described system reduces cost, weight, and packaging space compared to conventional EVT AWD solutions.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A hybrid electric vehicle (HEV), comprising:
a front driveline configured to drive front wheels;
a rear driveline configured to drive rear wheels;
an electrically variable transmission (EVT) including a power splitting gear set having an input member, a carrier coupled for rotation with the input member, a sun gear coupled for rotation with a connecting member, an annulus gear, and a plurality of pinion gears;
a transfer gear arrangement including an input gear in meshing engagement with the annulus gear, and an output gear connected for common rotation with the input gear and in meshing engagement with a final drive to provide drive torque thereto;
an internal combustion engine selectively connected to the input member of the EVT to provide drive torque to the front driveline;
a brake clutch coupled to the input member between the engine and the carrier;
a selectable one way clutch (SOWC) coupled to the input member between the engine and the carrier;
a first electric machine coupled to the EVT via the connecting member to selectively provide drive torque to the front driveline;

a second electric machine configured to selectively provide drive torque to the rear driveline; and a battery electrically coupled to the first and second electric machines for powering thereof, wherein the vehicle is absent of a P3 motor, wherein the internal combustion engine, the EVT, and the first and second electric machines are configured to provide the HEV with four-wheel drive or all-wheel drive capability.

2. The HEV of claim 1, wherein the first electric machine is arranged as a P2 motor, and wherein the second electric machine is arranged as a P4 motor.

3. The HEV of claim 1, wherein the second electric machine is distributed across a rear axle of the HEV.

4. The HEV of claim 1, wherein the final drive includes a differential.

5. The HEV of claim 1, further comprising:

a first power inverter module electrically coupled between the first electric machine and the battery; and a second power inverter module electrically coupled between the second electric machine and the battery.

6. The HEV of claim 1, further comprising a controller configured to:

operate the HEV in an HEV mode where the internal combustion engine provides drive torque to the front driveline, and the second electric machine provides drive torque to the rear driveline; and operate the HEV in an electric vehicle (EV) mode where the first electric machine provides drive torque to the front driveline, and the second electric machine provides drive torque to the rear driveline.

7. The HEV of claim 1, wherein the first electric machine is concentric with the power splitting gear set and the input member.

8. The HEV of claim 1, wherein an output of the internal combustion engine is coupled to a torsional vibration damper.

9. The HEV of claim 1, further comprising an electric drive module that includes the second electric machine and a gearbox assembly coupled to a differential.

* * * * *